3,446,074
MEASURING THE TEMPERATURE OF
MOLTEN METAL BY RADIOMETRY
Frank Thomas, Metz, France, assignor to Institut de Recherches de la Siderurgie Francaise, Saint Germain-en-Laye, Yvelines, France
Filed Oct. 12, 1967, Ser. No. 674,917
Claims priority, application France, Oct. 19, 1966, 80,611; Aug. 11, 1967, 117,621
Int. Cl. G01k 11/00; H04b 7/00
U.S. Cl. 73—355
7 Claims

ABSTRACT OF THE DISCLOSURE

The temperature of molten metal contained in a refractory receptacle is determined by placing an antenna adjacent the refractory wall of the receptacle to collect the Hertzian radiation emitted by the molten metal through the wall.

Background and summary of the invention

The present invention relates to a process and apparatus for measuring the temperature of molten metal by radiometry.

It is the principal object of this invention continuously to measure the temperature of a molten metal by measuring means which is neither in contact with, nor in view of, the molten metal so that the measuring means is not subject to wear due to the heat of the molten metal or to its visible or infra-red radiation.

It is another object of the invention is to permit continuous measurement of very high temperatures of molten metal, for instance in excess of 2000° C.

These and other objects are accomplished in accordance with the present invention by disposing an antenna adjacent the molten metal but separated therefrom by at least a portion of the thickness of one of the refractory walls forming a receptacle for the molten metal. The Hertzian radiation emitted by the molten metal through the wall is collected by the antenna, this Hertzian radiation is measured, and the temperature of the molten metal is determined in relation to the measured Hertzian radiation.

The apparatus of this invention comprises a receptacle for the molten metal, such as a conventional vessel used in steel making, which includes a metallic outer casing and a refractory lining in the casing in contact with the molten metal. The molten metal, such as molten steel, forms a bath in the receptacle and the outer casing defines an opening below the upper molten metal bath level. An antenna is positioned in the outer casing opening in contact with the refractory lining. At lease that portion of the refractory lining in contact with the antenna is transparent to Hertzian waves of ultra-high frequency, and the antenna is adapted to collect the Hertzian radiation emitted by the molten metal through that portion of the refractory lining. Means is connected to the antenna for detecting and measuring the ultra-high frequency Hertzian waves collected by the antenna, such means being conventional.

Brief description of drawing

The above and other objects and features of the invention will become more apparent in connection with the following detailed description of two embodiments thereof, taken in conjunction with the accompanying drawing wherein.

Detailed description

Figure 1:
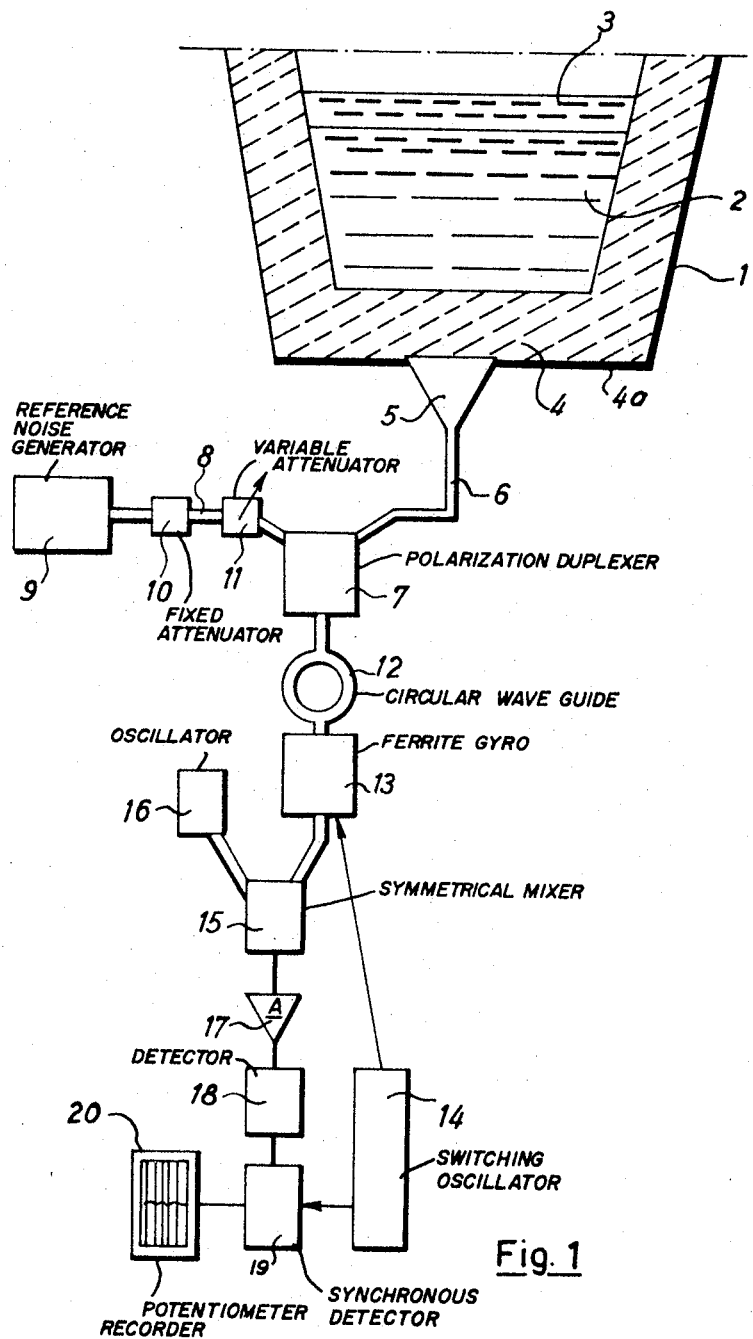
FIG. 1 illustrates one embodiment of the apparatus.

Referring first to FIG. 1, there is shown a ladle 1 constituting a receptacle for molten steel bath 2 whose upper level is covered by a slag layer 3. The ladle includes an outer steel casing 4a and a refractory lining 4 constituting the refractory walls of the receptacle. In the illustrated embodiment, the refractory lining is of magnesia. The bottom wall of the steel casing defines an opening and a small box 5 is attached to the steel casing by any suitable means over the opening.

The refractory material is transparent to Hertzian waves of ultra-high frequency, such as a range of 0.5 to 100 gigahertz, and is preferably selected from magnesia, dolomite, alumina, sillimanite, porous silica, mullite, and zirconia.

The opening in the steel casing constitutes a window through which the ultra-high frequency Hertzian waves emitted by the molten steel through the refractory lining may be collected in box 5 which thus functions as an antenna for the emitted Hertzian waves. A tube 6 of rectangular cross section, which serves as a wave guide, connects the antenna 5 to the polarization duplexer 7. The tube 6 selects the radiation of a frequency equal to 35 gigahertz ($\lambda = 8$ mm.). The polarization duplexer is also connected to a reference noise generator 9, functioning as a reference source, by tube 8 having the same cross section as tube 6 and also selecting the radiation equal to 35 gigahertz. The reference noise generator 9 emits a stable signal, of an energy level, which may be regulated by means of fixed attenuator 10 and variable attenuator 11.

From the signals coming respectively from wave guides 6 and 8, the duplexer 7 produces two orthogonal fields in a circular wave guide 12. A ferrite gyro 13, excited by switching oscillator 14, permits each signal to pass alternately to a symmetrical mixer 15. Due to an oscillator 16, this mixer permits a transposition of the millimetric signals into a range of frequency which is more convenient for amplification (for instance to 30 megahertz), which takes place in amplifier 17. The output of the amplifier is fed to a detector 18 which gives the average value of the signals coming respectively from the liquid steel bath 2 and the reference source 9. A synchronous detector 19, which is controlled by switching oscillator 14, separates the two signals. The differential signal thus obtained is received directly by a potentiometer recorder 20. The zero reading on the potentiometer is obtained by regulating the variable attenuator 11. The attenuation value, expressed in decibels, is a function of the absolute temperature of the liqued steel and may thus be calibrated directly in degrees of temperature.

If desired, a servomotor may regulate the attenuator to automate the process. A zero method or a method permitting the direct recording of the temperature may be used.

Obviously, while the receptacle has been illustrated as a ladle, any suitable vessel may be used, including channels through which the molten metal may continuously or discontinuously flow. The receptacle may be air tight, if desired.

It is known that a black body is an ideal body placed in a closed enclosure to absorb all impinging radiation of whatever type and from whatever direction. Such a black body will emit waves of all frequencies whose emitted energy depends solely on the tempreature. Any body, and particularly a liquid metal body, which is placed into an enclosure, while acting differently from a black body in respect of radiant emissions, nevertheless emits, among others, Hertzian waves whose energy is appreciable in the range of frequency between 0.5 and 100 gigahertz. Furthermore, Hertzian waves have the property of being at least partially transmitted by certain bodies which are opaque to visible and infrared radiation, such bodies including refractories. The present invention makes use of these physical phenomena and the particularly favorable transparency to ultra-high frequency Hertzian waves of the enumerated types of refractory materials.

It has been found that certain refractory materials should be preferred. Such materials are magnesia, dolomite, alumina, sillimanite—which is a silicate of alumina—porous silica, mullite, zirconia. These substances have a particularly favorable transparency to ultra-high frequency.

Thus, magnesia and dolomite, which are the conventional linings for metallurgical vessels, are ideally suited for the practice of the present invention, and all that is needed is to make a window in the outer steel casing of such vessels to which to attach the antenna in contact with the lining.

One of the advantages of measuring the metal bath temperature according to the invention resides in the fact that it may be applied to a molten metal protected from the atmosphere and subjected, for example, to vacuum treatment in an impermeable receptacle. It may equally well be applied to a flowing metal bath. Also, the temperature of a metal bath on which a lighter liquid floats may be measured directly in this manner. This is the case with ladles or converters wherein the liquid steel is covered with a relatively poorly conducting slag layer whose temperature may differ substantially from that of the metal bath. By placing the antenna adjacent the bottom of the receptacle or adjacent one of the side walls below the upper level of the metal bath, the antenna collects the radiation emitted by the metal and transmitted by the refractory walls of the receptacle. Thus, the temperature of the molten metal itself may be accurately measured.

Figure 2:
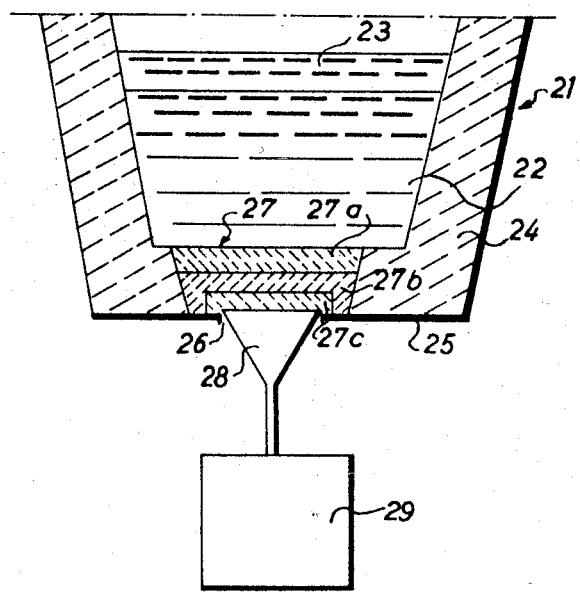
FIG. 2 shows another embodiment thereof.

FIG. 2 shows another embodiment of the invention. Ladle 21 contains the liquid steel bath 22 covered by slag layer 23. The outer steel casing 25 of the ladle holds the magnesia lining 24 of the ladle and defines the window 26 in its bottom wall. The portion of the refractory lining above the window 26 is constituted by a composite brick 27 having the form of a frusto-conical cone and constituted by a first layer 27a of magnesia in contact with the liquid steel bath, an intermediate layer 27b of alumina, and an outer layer 27c of porous silica. The small box 28, which serves an antenna collecting the Hertzian waves transmitted through brick 27, is attached to the outer casing and connected to known detection and measuring devices for the collected Hertzian waves, as schematically shown by box 29, such means having been fully described in connection with FIG. 1.

If desired, the composite brick 27 could also form a plug in one of the walls of the receptacle below the upper level of the metal bath it contains, with the most refractory material, such as magnesia or dolomite, being in direct contact with the metal bath. On the other hand, refractory materials having a chemical affinity to the metal bath are out of contact therewith, a neutral or amphoteric material being placed intermediate the two refractory layers of the brick.

One of the advantages of such bricks is their ready replacement in the refractory walls without touching the remainder of the receptacle lining. Also, the transparency of the three layers of the brick to ultra-high frequency Hertzian waves differs. Thus, magnesia, which is in contact with the metal bath, resists temperature up to 2000° C. and more, and has a good transparency to the Hertzian waves. The intermediate alumina layer has a very good transparency to these waves, and the outer porous silica layer directly adjacent the antenna has an excellent transparency to ultra-high frequency Hertzian waves but has less resistance to high temperatures than magnesia. But since the thermal gradient in the brick is relatively high, the porous silica is not damaged by unduly high temperatures. Thus, a brick of this type assures an excellent transmission of the Hertzian waves while still making it possible for the metal bath to reach temperatures of the order to 2000° C.

Another advantage is that the alumina layer, which is an amphoteric oxide, separates the basic magnesia layer from the acidic silica layer and thus obviates any possibility of chemical reactions between the inner and outer layers.

While the invention has been described in connection with certain now preferred embodiments, it will be clearly understood that many modifications and variations may occur to those skilled in the art, particularly after benefitting from the present teaching, without departing from the spirit and scope of this invention.

What is claimed is:
1. A process for measuring the temperature of a molten metal contained in a receptacle with refractory walls comprising the steps of:
   (a) disposing an antenna adjacent the molten metal but separated therefrom by at least a portion of the thickness of one of said refractory walls,
   (b) collecting the Hertzian radiation emitted by said molten metal through said one wall by the antenna,
   (c) measuring the said Hertzian radiation, and
   (d) determining the temperature of the molten metal in relation to the measured Hertzian radiation.

2. The process of claim 1, wherein the molten metal is steel.

3. An apparatus for measuring the temperature of a molten metal, comprising:
   (a) a receptacle for the molten metal, the receptacle including
      (1) a metallic outer casing and
      (2) a refractory lining in said casing in contact with the molten metal, the molten metal forming a bath in said receptacle having an upper level,
      (3) the outer casing defining an opening below said upper molten metal bath level;
   (b) an antenna positioned in said outer casing opening in contact with the refractory lining,
      (4) at least a portion of the refractory lining in contact with the antenna being transparent to Hertzian waves of ultra-high frequency, and the antenna being adapted to collect Hertzian radiation emitted by said molten metal through said portion of the refractory lining; and
   (c) means connected to said antenna for detecting and measuring the ultra-high frequency Hertzian waves collected by the antenna.

4. The apparatus of claim 3, wherein the refractory lining transparent to Hertzian waves consists at least of one of the refractory materials selected from the group consisting of magnesia, dolomite, alumina, sillimanite, porous silica, mullite and zirconia.

5. The apparatus of claim 4, wherein the portion of the refractory lining is a composite brick including at least two of said refractory materials.

6. The apparatus of claim 5, wherein said composite brick comprises a first layer of a refractory material resistant to temperatures of the order of 2000° C., said first layer being in contact with the molten metal, an outer layer of a refractory material resistant to lower temperatures but more transparent to the ultra-high frequency Hertzian waves than said first layer, said outer layer being in contact with said antenna, and an intermediate layer of amphoteric refractory material separating the first and outer layers.

7. The apparatus of claim 6, wherein the first layer is of magnesia, the intermediate layer is of alumina, and the other layer is of porous silica.

References Cited

UNITED STATES PATENTS

| 2,151,928 | 3/1939 | Mead | 73—355 XR |
| 3,129,330 | 4/1964 | Seling. | |
| 3,230,532 | 1/1966 | Whitney. | |

OTHER REFERENCES

Dickie: The Measurement of Thermal Radiation at Microwave Frequencies, Review of Science Instruments, vol. 17, No. 7, July 1946.

LOUIS R. PRINCE, *Primary Examiner.*

F. SHOON, *Assistant Examiner.*

U.S. Cl. X.R.

343—100